Oct. 21, 1952
A. WARMISHAM
2,614,461
FOUR COMPONENT OPTICAL OBJECTIVE
Filed Aug. 17, 1951
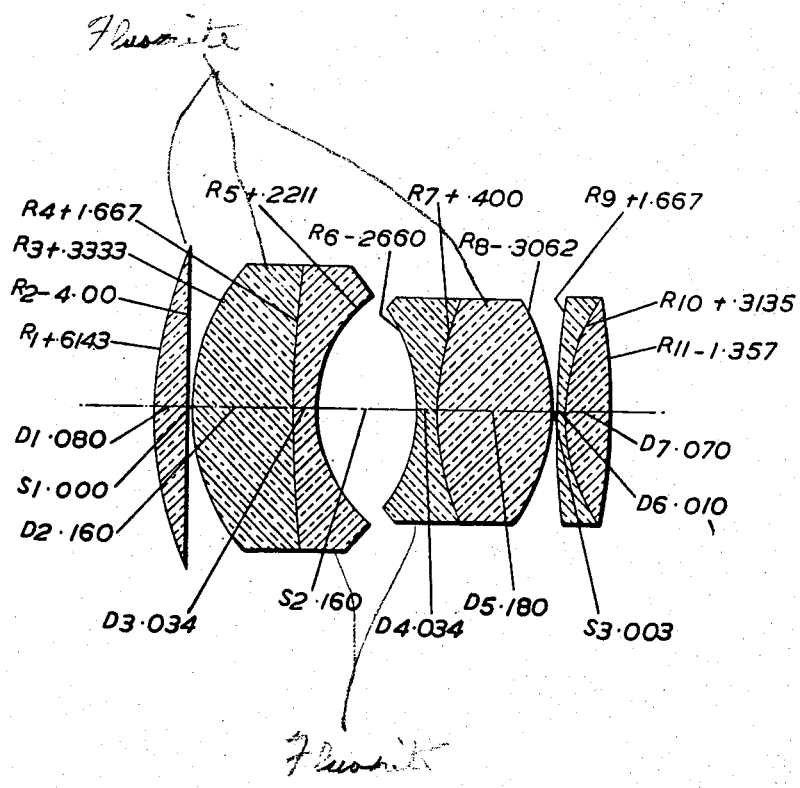
Inventor
Arthur Warmisham
By
Emery, Holcomb & Blair
Attorney Patented Oct. 21, 1952

2,614,461

UNITED STATES PATENT OFFICE 2,614,461

FOUR COMPONENT OPTICAL OBJECTIVE

Arthur Warmisham, Leicester, England, assignor to Taylor, Taylor & Hobson Limited, Leicester, England, a British company Application August 17, 1951, Serial No. 242,249
In Great Britain August 24, 1950

18 Claims. (Cl. 88—57)

This invention relates to an optical objective corrected for spherical and chromatic aberrations, coma, astigmatism, field curvature and distortion, and comprising two compound divergent meniscus inner components having their external faces concave towards a diaphragm between them and each consisting of a convergent element and a divergent element, such components being located between two convergent outer components. Usually in such objectives the outer components are in the form of simple elements, although objectives of this type designed to suit special requirements are known in which one or both of the outer components are compound.

The present invention has for its object to provide an objective having considerably greater transparency, and better colour correction, especially for secondary spectrum, than is usual in objectives of this type, whilst still maintaining a reasonably high aperture greater than, say F/3. It is already known that crystalline fluoride (calcium fluoride) has properties well adapted to assist in improving transparency and colour corrections, but owing to its relatively low refractive index, it is difficult, without serious reduction in the aperture or in the corrections, to accommodate enough fluorite in a high aperture objective to make its use worth while.

This difficulty is overcome in the objective according to the invention, wherein crystalline fluorite is used for the simple front outer component and for the convergent elements in the two inner components, the rear outer component being in the form of a cemented doublet including a divergent element made of a material having mean refractive index between 1.55 and 1.60 and a convergent element made of material having mean refractive index greater than 1.65 and at least .06 greater than that of the divergent element, the cemented surface being collective and convex towards the diaphragm. The radii of curvature of the surfaces of the objective are conveniently all greater than one fifth of the equivalent focal length of the objective.

It should be made clear that the terms "front" and "rear" are used herein, in accordance with the normal convention to indicate respectively the sides of the objective nearer to and further from the longer conjugate.

The sum of the axial thicknesses of the three fluorite elements is preferably greater than half the overall axial length of the whole objective.

The rear surface of the simple front component is preferably slightly convex towards the diaphragm with radius of curvature greater than 1.8 times the equivalent focal length of the objective.

Conveniently, the power of the collective cemented surface in the rear component lies between .3 and .4 times the equivalent power of the objective.

Preferably the relative partial dispersion between the F and $g$ lines (as expressed by the ratio $(n_F-n_g)/(n_C-n_F)$, where $n_F$, $n_g$ and $n_C$ are respectively the refractive indices for the F, $g$ and C lines) of the material used for one of the three divergent elements of the objective is greater than .550, whilst those for the other two divergent elements are less than .550.

The curvature of the internal contact surface in the rear divergent inner component conveniently exceeds that of the internal contact surface in the front inner component by between 1.0 and 2.3 times the equivalent power of the objective.

A convenient practical example of objective according to the invention is illustrated in the accompanying drawing and numerical data therefor are given in the following table, in which $R_1 R_2 \ldots$ represent the radii of curvature of the individual surfaces of the objective, the positive sign indicating that the surface is convex towards the front and the negative sign that it is concave thereto, $D_1 D_2 \ldots$ represent the axial thicknesses of the various elements of the objective, and $S_1 S_2 S_3$ represent the axial air separations between the components. The table also gives the mean refractive index $n_D$ for the D-line and the Abbé V number of the material used for each element of the objective.

The insertion of equals (=) signs in the radius columns of the tables, in company with plus (+) and minus (—) signs which indicate whether the surface is convex or concave to the front, is for conformity with the usual Patent Office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the tables may have to be treated as negative for some calculations as is well understood in the art.

| Equivalent focal length 1.000. Relative Aperture F/2.0. ||||
|---|---|---|---|
| Radius | Thickness or Air Separation | Refractive Index $n_D$ | Abbé V Number |
| $R_1=+.6143$ | $D_1=.080$ | 1.4339 | 95.4 |
| $R_2=-4.00$ | $S_1=.003$ | | |
| $R_3=+.3333$ | $D_2=.160$ | 1.4339 | 95.4 |
| $R_4=+1.667$ | $D_3=.034$ | 1.5151 | 56.4 |
| $R_5=+.2211$ | $S_2=.160$ | | |
| $R_6=-.2660$ | $D_4=.034$ | 1.5151 | 56.4 |
| $R_7=+.400$ | $D_5=.180$ | 1.4339 | 95.4 |
| $R_8=-.3062$ | $S_3=.003$ | | |
| $R_9=+1.667$ | $D_6=.010$ | 1.582 | 41.0 |
| $R_{10}=+.3135$ | $D_7=.070$ | 1.690 | 55.0 |
| $R_{11}=-1.357$ | | | |

In this example, the convergent simple front component and the convergent outer elements of the two inner components are all made of crystalline fluorite, and the sum of the axial thicknesses of these three elements amounts to .420 times the equivalent focal length of the objective, the overall axial length of the whole objective being .734 times such focal length.

The power of the collective cemented surface $R_{10}$ in the rear component is .3453 times the equivalent power of the objective, and the index difference across such surface is .108.

The divergent inner elements of the two inner components are made of the same material, and the relative partial dispersion of this material between the F and g lines is .547. The corresponding relative partial dispersion of the material of the other divergent element of the objective, namely the front element of the rear component, is .573.

The curvatures of the internal contact surfaces $R_4$ and $R_7$ in the two inner components are respectively .6 and 2.5 times the equivalent power of the objective, so that the difference between such curvatures is 1.9 times such power.

What I claim as my invention and desire to secure by Letters Patent is:

1. An optical objective corrected for spherical and chromatic aberrations, coma, astigmatism, field curvature and distortion, and comprising a diaphragm, two compound divergent meniscus components disposed one on each side of the diaphragm with their external faces concave thereto and each consisting of a convergent element and a divergent element, a simple convergent front component located in front of the divergent components, such front component and also the convergent elements of the two divergent components being made of crystalline fluorite, and a convergent rear component located behind the divergent components and in the form of a cemented doublet whose cemented surface is collective and convex towards the diaphragm, such rear component consisting of a divergent element made of a material having mean refractive index between 1.55 and 1.60 and a convergent element made of a material having means refractive index greater than 1.65 and at least .06 greater than that of the associated divergent element, the power of the collective cemented surface in the rear component lying between .3 and .4 times the equivalent power of the objective.

2. An optical objective as claimed in claim 1, in which the rear surface of the simple front component is slightly convex towards the diaphragm and has radius of curvature between 1.8 and 20.0 times the equivalent focal length of the objective.

3. An optical objective corrected for spherical and chromatic aberrations, coma, astigmatism, field curvature and distortion, and comprising a diaphragm, two compound divergent meniscus components disposed one on each side of the diaphragm with their external faces concave thereto and each consisting of a convergent element and a divergent element, a simple convergent front component located in front of the divergent components, such front component and also the convergent elements of the two divergent components being made of crystalline fluorite, and a convergent rear component located behind the divergent components and in the form of a cemented doublet whose cemented surface is collective and convex towards the diaphragm, such rear component consisting of a divergent element made of a material having mean refractive index between 1.55 and 1.60 and a convergent element made of a material having mean refractive index greater than 1.65 and at least .06 greater than that of the associated divergent element, the radii of curvature of the surfaces of the objective all being greater than one fifth of the equivalent focal length of the objective, the power of the collective cemented surface in the rear component lying between .3 and .4 times the equivalent power of the objective.

4. An optical objective as claimed in claim 3, in which the sum of the axial thicknesses of the three fluorite elements is greater than half the overall axial length of the objective.

5. An optical objective as claimed in claim 4, in which the rear surface of the simple front component is slightly convex towards the diaphragm and has radius of curvature between 1.8 and 20.0 times the equivalent focal length of the objective.

6. An optical objective as claimed in claim 3, in which the rear surface of the simple front component is slightly convex towards the diaphragm and has radius of curvature between 1.8 and 20.0 times the equivalent focal length of the objective.

7. An optical objective corrected for spherical and chromatic aberrations, coma, astigmatism, field curvature and distortion, and comprising a diaphragm, two compound divergent meniscus components disposed one on each side of the diaphragm with their external faces concave thereto and each consisting of a convergent element and a divergent element, a simple convergent front component located in front of the divergent components, such front component and also the convergent elements of the two divergent components being made of crystalline fluorite, and a convergent rear component located behind the divergent components and in the form of a cemented doublet whose cemented surface is collective and convex towards the diaphragm, such rear component consisting of a divergent element made of a material having mean refractive index between 1.55 and 1.60 and a convergent element made of a material having mean refractive index greater than 1.65 and at least 0.6 greater than that of the associated divergent element, the sum of the axial thicknesses of the three fluorite elements being greater than half the overall axial length of the objective, the power of the collective cemented surface in the rear component lying between .3 and .4 times the equivalent power of the objective.

8. An optical objective as claimed in claim 7, in which the rear surface of the simple front component is slightly convex towards the diaphragm and has radius of curvature between 1.8 and 20.0 times the equivalent focal length of the objective.

9. An optical objective corrected for spherical and chromatic aberrations, coma, astigmatism, field curvature and distortion, and comprising a diaphragm, two compound divergent meniscus components disposed one on each side of the diaphragm with their external faces concave thereto and each consisting of a convergent element and a divergent element, a simple convergent front component located in front of the divergent components, such front component and also the convergent elements of the two divergent components being made of crystalline fluorite, and a convergent rear component located behind the divergent components and in the form of a cemented doublet whose cemented surface is collective and convex towards the diaphragm, such rear component consisting of a divergent element made of a material having mean refractive index between 1.55 and 1.60 and a convergent element made of a material having mean refractive index greater than 1.65 and at least .06 greater than that of the associated divergent element, the curvature of the internal contact surface in the rear divergent inner component exceeding that of the internal contact surface in the front divergent inner component by between 1.0 and 2.3 times the equivalent power of the objective.

10. An optical objective as claimed in claim 9, in which the radii of curvature of the surfaces of the objective are all greater than one fifth of the equivalent focal length of the objective.

11. An optical objective as claimed in claim 10, in which the sum of the axial thicknesses of the three fluorite elements is greater than half the overall axial length of the objective.

12. An optical objective as claimed in claim 9, in which the sum of the axial thicknesses of the three fluorite elements is greater than half the overall axial length of the objective.

13. An optical objective as claimed in claim 9, in which the rear surface of the simple front component is slightly convex toward the diaphragm and has radius of curvature between 1.8 and 20.0 times the equivalent focal length of the objective.

14. An optical objective corrected for spherical and chromatic aberrations, coma, astigmatism, field curvature and distortion, and comprising a diaphragm, two compound divergent meniscus components disposed one on each side of the diaphragm with their external faces concave thereto and each consisting of a convergent element and a divergent element, a simple convergent front component located in front of the divergent components, such front component and also the convergent elements of the two divergent components being made of crystalline fluorite, and a convergent rear component located behind the divergent components and in the form of a cemented doublet whose cemented surface is collective and convex towards the diaphragm, such rear component consisting of a divergent element made of a material having mean refractive index between 1.55 and 1.60 and a convergent element made of a material having mean refractive index greater than 1.65 and at least .06 greater than that of the associated divergent element, the power of the collective cemented surface in the rear component lying between .3 and .4 times the equivalent power of the objective, whilst the curvature of the internal contact surface in the rear divergent inner component exceeds that of the internal contact surface in the front divergent inner component by between 1.0 and 2.3 times the equivalent power of the objective.

15. An optical objective as claimed in claim 14, in which the radii of curvature of the surfaces of the objective are all greater than one fifth of the equivalent focal length of the objective.

16. An optical objective as claimed in claim 15, in which the sum of the axial thicknesses of the three fluorite elements is greater than half the overall axial length of the objective.

17. An optical objective as claimed in claim 14, in which the sum of the axial thicknesses of the three fluorite elements is greater than half the overall axial length of the objective.

18. An optical objective as claimed in claim 14, in which the rear surface of the simple front component is slightly convex towards the diaphragm and has radius of curvature between 1.8 and 20.0 times the equivalent focal length of the objective.

ARTHUR WARMISHAM.

REFERENCES CITED

The following references are of record in the file of this patent:

UNITED STATES PATENTS

| Number | Name | Date |
|---|---|---|
| 1,786,916 | Merte | Dec. 30, 1930 |
| 2,252,681 | Aklin | Aug. 19, 1941 |
| 2,262,998 | Frederick et al. | Nov. 18, 1941 |
| 2,343,627 | Aklin | Mar. 7, 1944 |
| 2,350,035 | Herzberger | May 30, 1944 |
| 2,455,808 | Reiss | Dec. 7, 1948 |